US006996665B2

(12) United States Patent
DeSota et al.

(10) Patent No.: US 6,996,665 B2
(45) Date of Patent: Feb. 7, 2006

(54) HAZARD QUEUE FOR TRANSACTION PIPELINE

(75) Inventors: Donald R. DeSota, Portland, OR (US); Bruce M. Gilbert, Beaverton, OR (US); Robert Joersz, Portland, OR (US); Eric N. Lais, Tillson, NY (US); Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/334,427

(22) Filed: Dec. 30, 2002

(65) Prior Publication Data

US 2004/0128461 A1    Jul. 1, 2004

(51) Int. Cl.
*G06F 12/00* (2006.01)

(52) U.S. Cl. .................... 711/109; 711/108; 711/140; 711/169; 712/216; 712/217; 712/218; 712/219

(58) Field of Classification Search .............. 711/108, 711/140, 169; 712/216–219
See application file for complete search history.

(56) References Cited

U.S. PATENT DOCUMENTS

| 5,471,591 | A  | * | 11/1995 | Edmondson et al. | ........ 712/217 |
| 6,288,730 | B1 | * | 9/2001  | Duluk et al.     | ................ 345/552 |
| 6,417,848 | B1 | * | 7/2002  | Battle           | .................. 345/419 |
| 6,457,131 | B2 | * | 9/2002  | Kuemerle         | ................... 713/300 |
| 6,542,986 | B1 | * | 4/2003  | White            | ....................... 712/217 |
| 6,715,060 | B1 | * | 3/2004  | Arnold et al.    | ............... 712/217 |

OTHER PUBLICATIONS

Microsoft Press, Computer Dictionary, 1997, 3rd edition, pp 215.*

* cited by examiner

*Primary Examiner*—Donald Sparks
*Assistant Examiner*—Bao Q. Truong
(74) *Attorney, Agent, or Firm*—Abdy Raissinia

(57) ABSTRACT

A hazard queue for a pipeline, such as a multiple-stage pipeline for transaction conversion, is disclosed. A transaction in the pipeline is determined to represent a hazard relative to another transaction, such as by evaluating the transaction against a hazard content-addressable memory (CAM). The hazard CAM can enforce various hazard rules, such as considering a transaction as active if it is referencing a memory line and is currently being processed within the pipeline, and ensuring that only one active transaction with a given coherent memory line is in the pipeline at a single time. In response to determining that a transaction is a hazard, the transaction is routed to a hazard queue, such as at the end of the pipeline. Once the hazard is released, the transaction re-enters the pipeline.

18 Claims, 5 Drawing Sheets

HAZARD QUEUE FOR TRANSACTION PIPELINE

BACKGROUND OF THE INVENTION

1. Technical Field

This invention relates generally to transactions, such as memory requests and their responses, and more particularly to the conversion of such transactions into performable actions.

2. Description of the Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

Multi-processor systems usually include one or more memory controllers to manage memory transactions from the various processors. The memory controllers negotiate multiple read and write requests emanating from the processors, and also negotiate the responses back to these processors. Usually, a memory controller includes a pipeline, in which transactions, such as requests and responses, are input, and actions that can be performed relative to the memory for which the controller is responsible are output. The pipeline thus performs transaction conversion, converting the transactions to such actions that can be performed to effect the transactions. Transaction conversion is commonly performed in a single stage of a pipeline, such that transaction conversion to performable actions is performed in one step.

However, performing transaction conversion in a single stage of a pipeline suffers from some deficiencies. They may be inefficient, since the memory controller must convert a given transaction to performable actions before it acts on the next transaction. This can make the pipeline a bottleneck within the performance of the memory controller, decreasing overall performance of the memory controller, and hence the multi-processor system of which it is a part. Single-stage conversion may also be difficult to implement, due to the complexity involved in converting a transaction into performable actions.

Performing transaction conversion in multiple stages overcomes these problems. Such a solution is described in the commonly assigned patent application entitled "Multiple-Stage Pipeline for Transaction Conversion" Ser. No. 10/344,855. A given transaction is converted over a number of different stages. This enables more than one transaction to be processed at one time. For instance, a first stage may be processing one transaction, a second stage may be processing another transaction, and a third stage may be processing a third transaction, all at the same time.

A potential difficulty with converting transactions over a number of stages, where a number of transactions can be in the process of being converted all at the same time, is when two transactions are attempting to access the same memory line. For instance, one transaction may be attempting to write a value to the same memory line that another transaction is trying to read the value stored therein. This situation is generally known as a hazard. If hazards are not handled appropriately, they can cause processing errors within multi-processor systems, or, worse, may cause such systems to crash.

For these and other reasons, therefore, there is a need for the present invention.

SUMMARY OF THE INVENTION

The invention relates to a hazard queue for a transaction pipeline. In a method of the invention, a transaction is determined to represent a hazard relative to another transaction in a pipeline. In response, the method routes the transaction to a hazard queue. Once the hazard is released, the method causes the transaction to re-enter the pipeline at a stage thereof.

A system of the invention includes a plurality of processors, local RAM for the plurality of processors, and at least one memory controller. The memory controller manages transactions relative to the local RAM. The controller has a multiple-stage pipeline and a hazard queue. The pipeline includes a stage in which transactions are examined for hazards. Those of the transactions having hazards are routed to the hazard queue, for re-entry into the pipeline once the hazards have been released.

A controller of the invention, for a node of a system to manage transactions relative to at least a portion of memory of the node, includes a pipeline, a hazard queue, and a hazard memory. Transactions are converted within the pipeline into performable actions to effect the transactions relative to the portion of memory. Those of the transactions that have hazards are routed to the hazard queue until the hazards have been released. The hazard memory is used to look up the hazards while the transactions are within the pipeline.

Other features, aspects, embodiments and advantages of the invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DESCRIPTION OF THE PREFERRED EMBODIMENT

Overview

Figure 1:
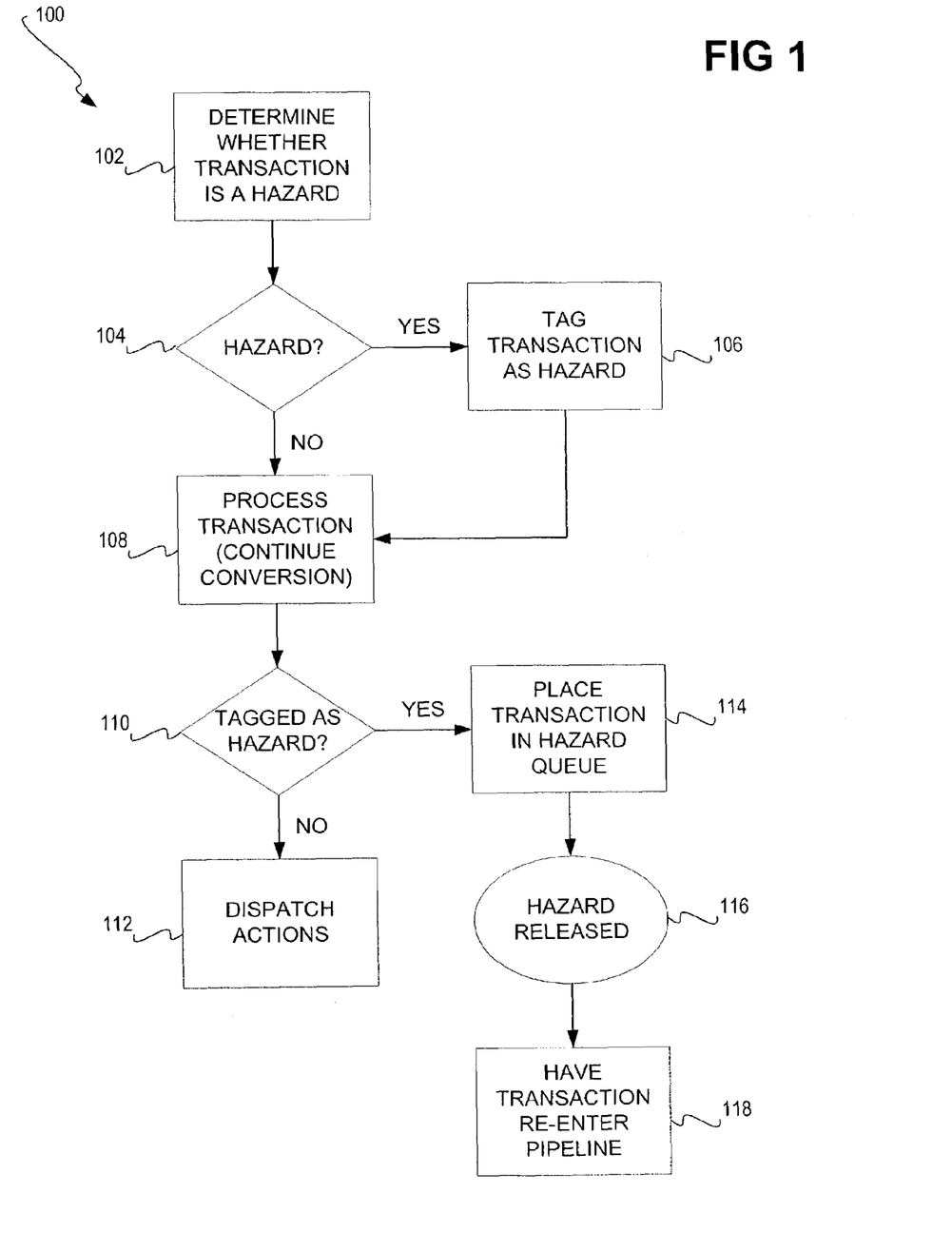
FIG. 1 is a flowchart of a method according to a preferred embodiment of the invention, and is suggested for printing on the first page of the patent.

FIG. 1 shows a method 100 according to a preferred embodiment of the invention. The method 100 can be implemented as an article of manufacture having a computer-readable medium and means in the medium for performing the functionality of the method 100. The medium may be a recordable data storage medium, a modulated carrier signal, or another type of medium. The method 100 is for use in conjunction with the conversion of a transaction into a concurrent set of performable actions using a multiple-stage pipeline. The method 100 preferably is operable within a multiple-processor system in which the transactions relate to memory requests and memory responses from and to the processors, to properly manage the memory vis-à-vis the processors. The method 100 specifically processes transactions that represent hazards.

The method 100 determines whether a transaction represents a hazard (102). A hazard typically occurs when the transaction relates to a memory line to which another transaction in the pipeline also relates. In one embodiment, a hazard content addressable memory (CAM) is utilized to determine whether the transaction is a hazard. The hazard CAM logs aspects of all transactions currently in at least the pipeline, such that the transactions can be compared against the hazard CAM to determine whether they represent hazards. If the transaction represents a hazard (104), it is tagged as hazardous (106). Regardless of whether the transaction represents a hazard or not, the transaction is processed (108). That is, the process by which the transaction is converted into a concurrent set of performable actions is continued.

At the end of the conversion process, if the transaction has been previously marked as hazardous (110), it is placed in a hazard queue (114) instead of being dispatched. At some point, the hazard is released (116). This means that the hazard no longer exists. For instance, the other transaction in the pipeline that relates to the same memory line may have exited the pipeline, and its concurrent set of actions for effecting the transaction may have been performed. In such instance, the transaction re-enters the pipeline (118) whereupon it is dispatched. Preferably, the transaction is granted priority relative to other transactions that may enter the pipeline, to avoid starving such transactions in the hazard queue.

If the transaction was not marked as hazardous (110), then the concurrent set of performable actions to which the transaction has been converted is dispatched (112). This allows the set of actions to be performed. Performing the actions thus effects the transaction.

Technical Background

Figure 2:
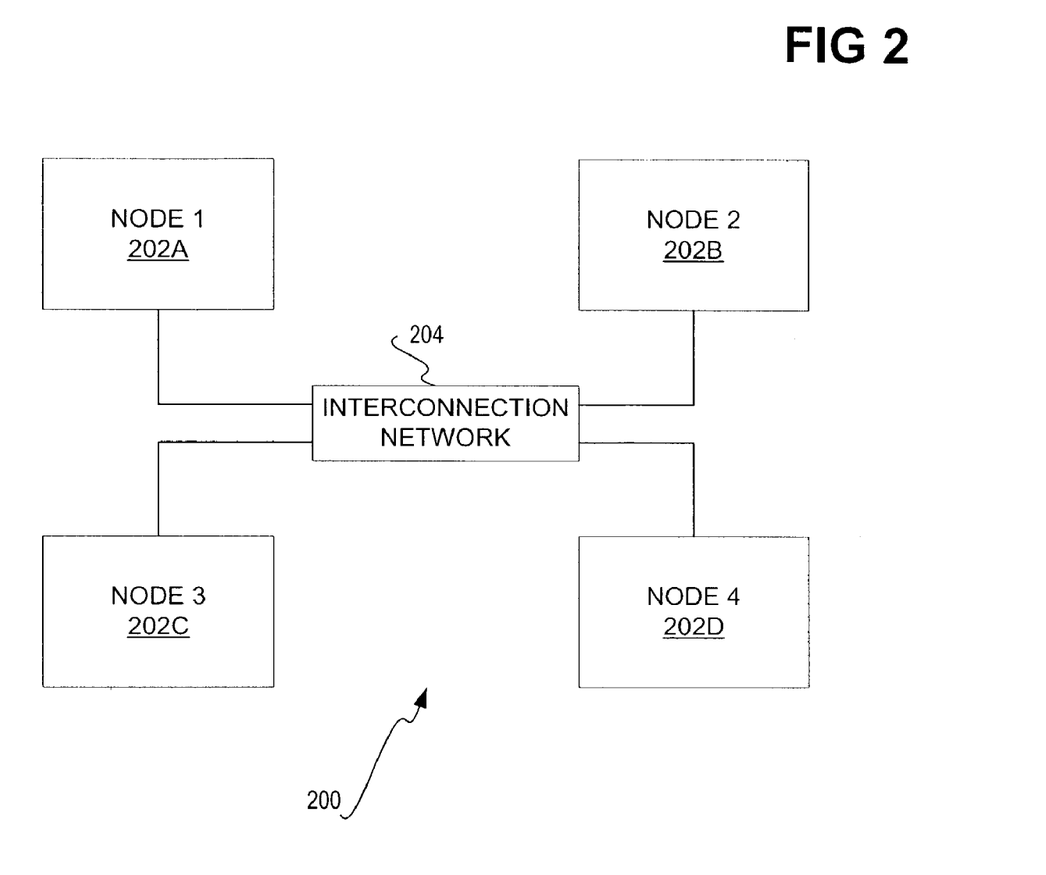
FIG. 2 is a diagram of a multiple-node system having a number of multi-processor nodes, in conjunction with which embodiments of the invention may be implemented.

FIG. 2 shows a multiple-node system 200 in accordance with which embodiments of the invention may be implemented. The system 200 includes a number of multiple-processor nodes 202A, 202B, 202C, and 202D, which are collectively referred to as the nodes 202. The nodes 202 are connected with one another through an interconnection network 204. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
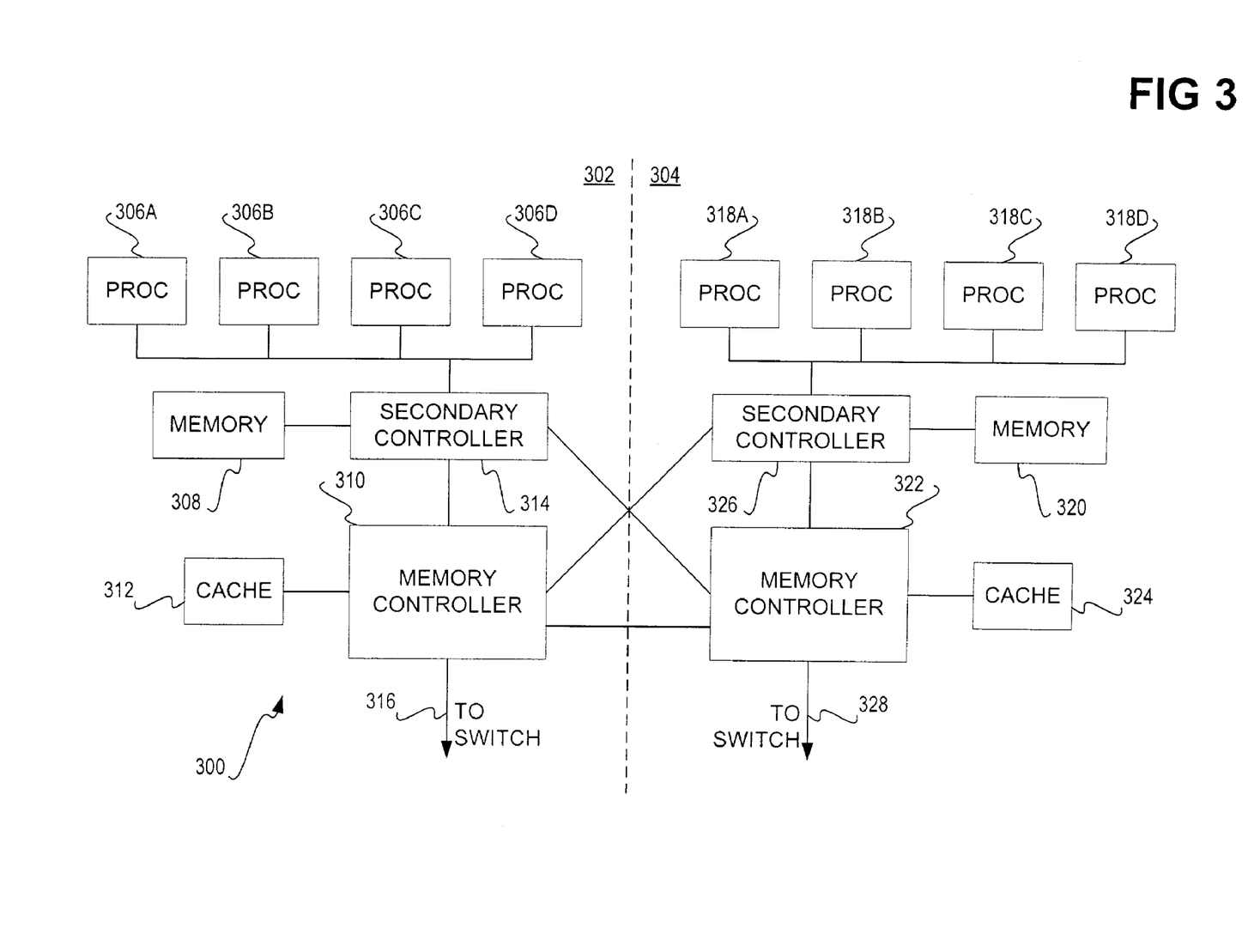
FIG. 3 is a diagram of one of the nodes of the system of FIG. 2 in more detail, according to an embodiment of the invention.

FIG. 3 shows in more detail a node 300, according to an embodiment of the invention, that can implement one or more of the nodes 202 of FIG. 2. As can be appreciated by those of ordinary skill within the art, only those components needed to implement one embodiment of the invention are shown in FIG. 3, and the node 300 may include other components as well. The node 300 is divided into a left part 302 and a right part 304. The left part 302 has four processors 306A, 306B, 306C, and 306D, collectively referred to as the processors 306, whereas the right part 304 has four processors 318A, 318B, 318C, and 318D, collectively referred to as the processors 318. Each of the parts 302 and 304 can operate as a distinct node, or quad, since each has four processors, or the parts 302 and 304 can operate together as a single node.

The left part 302 has a left memory bank 308, whereas the right part 304 has a right memory bank 320. The memory banks 308 and 320 represent two contiguous amounts of random-access memory (RAM) local to the node parts 302 and 304 respectively. The bank 308 is the local RAM associated with processors 306, whereas the bank 320 is the local RAM associated with processors 318. The processors 306, the secondary controller 314, and the left memory bank 308 together form an integral computing unit. Likewise, the processors 318, the secondary controller 326, and the memory bank 320 together form an integral computing unit. These two computer units can be configured into the same or different system partitions.

The left memory controller 310 manages requests to and responses from the secondary controllers 314 and 326 that are even cache lines, whereas the right memory controller 322 manages requests to and responses from the secondary controllers 314 and 326 that are odd cache lines. Therefore, the two memory controllers 310 and 322 together manage the two memory backs jointly, one for the even cache lines and the other for the odd caches lines. Each of the controllers 310 and 322 may be an applications-specific integrated circuit (ASIC) in one embodiment, as well as another combination of software and hardware. To assist management of the banks 308 and 320, the controllers have caches 312 and 324, respectively.

Thus, the left secondary controller 314 specifically interfaces the memory 308, the processors 306, and the memory controller 310 with one another, and the right secondary controller 326 specifically interfaces the memory 320, the processors 318, and the memory controller 322 with one another. Each of the memory controllers 310 and 322 is preferably directly connected to the interconnection network that connects all the nodes, such as the interconnection network 204 of FIG. 2. This is indicated by the line 316, with respect to the memory controller 310, and by the line 328, with respect to the memory controller 322.

Figure 4:
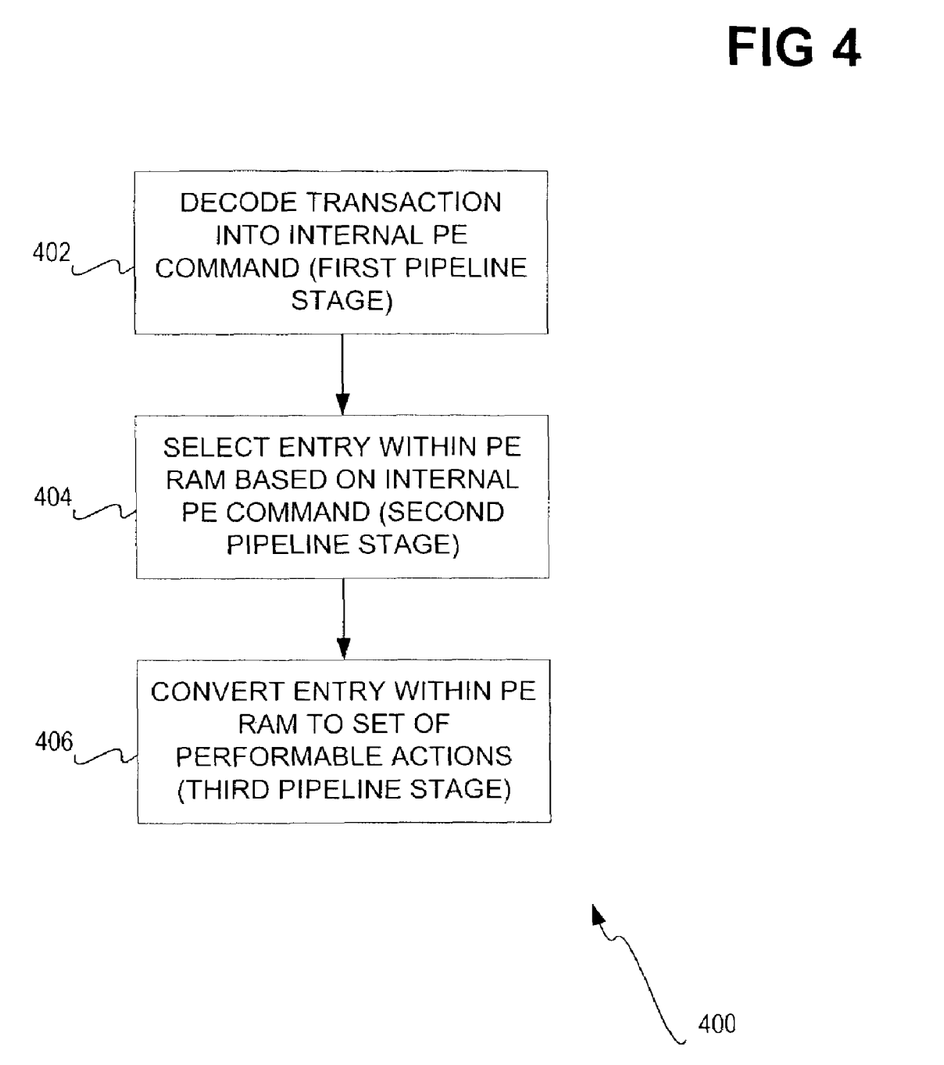
FIG. 4 is a flowchart of a method for converting transactions in a multiple-stage pipeline, in conjunction with which embodiments of the invention may be implemented.

FIG. 4 shows a method 400 for converting a transaction into a concurrent set of performable actions in a number of pipeline stages, in accordance with which embodiments of the invention may be implemented. That is, the method 400 represents the multiple-stage pipeline transaction conversion process in conjunction with which transaction evaluation for hazards may be implemented. Prior to performance of the method 400, arbitration of the transaction among other transactions may be accomplished to determine the order in which they enter the pipeline.

In a first, decode, pipeline stage, a transaction is decoded into an internal protocol evaluation (PE) command (402). The internal PE command is used by the method 400 to assist in determining the set of performable actions that may be concurrently performed to effect the transaction. In one embodiment, a look-up table (LUT) is used to retrieve the internal PE command, based on the transaction proffered. There may be more than one LUT, one for each different type of transaction. For instance, the method 400 may utilize a coherent request decode random-access memory (RAM) as the LUT for coherent memory requests, a non-coherent request decode RAM as the LUT for non-coherent memory requests, and a response decode RAM as the LUT for memory responses.

In a second, integration, pipeline stage, an entry within a PE RAM is selected based on the internal PE command (404). The PE RAM is the memory in which the performable actions are specifically stored or otherwise indicated. The entry within the PE RAM thus indicates the performable actions to be performed for the transaction, as converted to the internal PE command. In one embodiment, the PE command is first converted into a base address within the PE RAM, and an associated qualifier having a qualifier state, which are then used to select the appropriate PE RAM entry. Furthermore, the transaction may be arbitrated among other transactions within the second pipeline stage. That is, the transactions may be re-arbitrated within the second stage, such that the order in which the transactions had entered the pipeline may be changed. Preferably, the determination of whether a transaction represents a hazard is accomplished in this second, integration pipeline stage.

In a third, evaluation, pipeline stage, the entry within the PE RAM is converted to a concurrent set of performable actions to effect the transaction (406). In one embodiment, this is accomplished by selecting the concurrent set of performable actions, based on the entry within the PE RAM, where the PE RAM stores or otherwise indicates the actions to be performed. Once the performable actions have been determined, the conversion of the transaction to the performable actions is complete. The actions may then be preferably concurrently dispatched for performance to effect the transaction relative to the memory of the multiple-processor system. If the transaction has been tagged as hazardous, then it may enter a hazard queue, for re-entry into the pipeline once the hazard has been released.

Hazard Processing within Multiple-Stage Pipeline for Memory Controller

Figure 5:
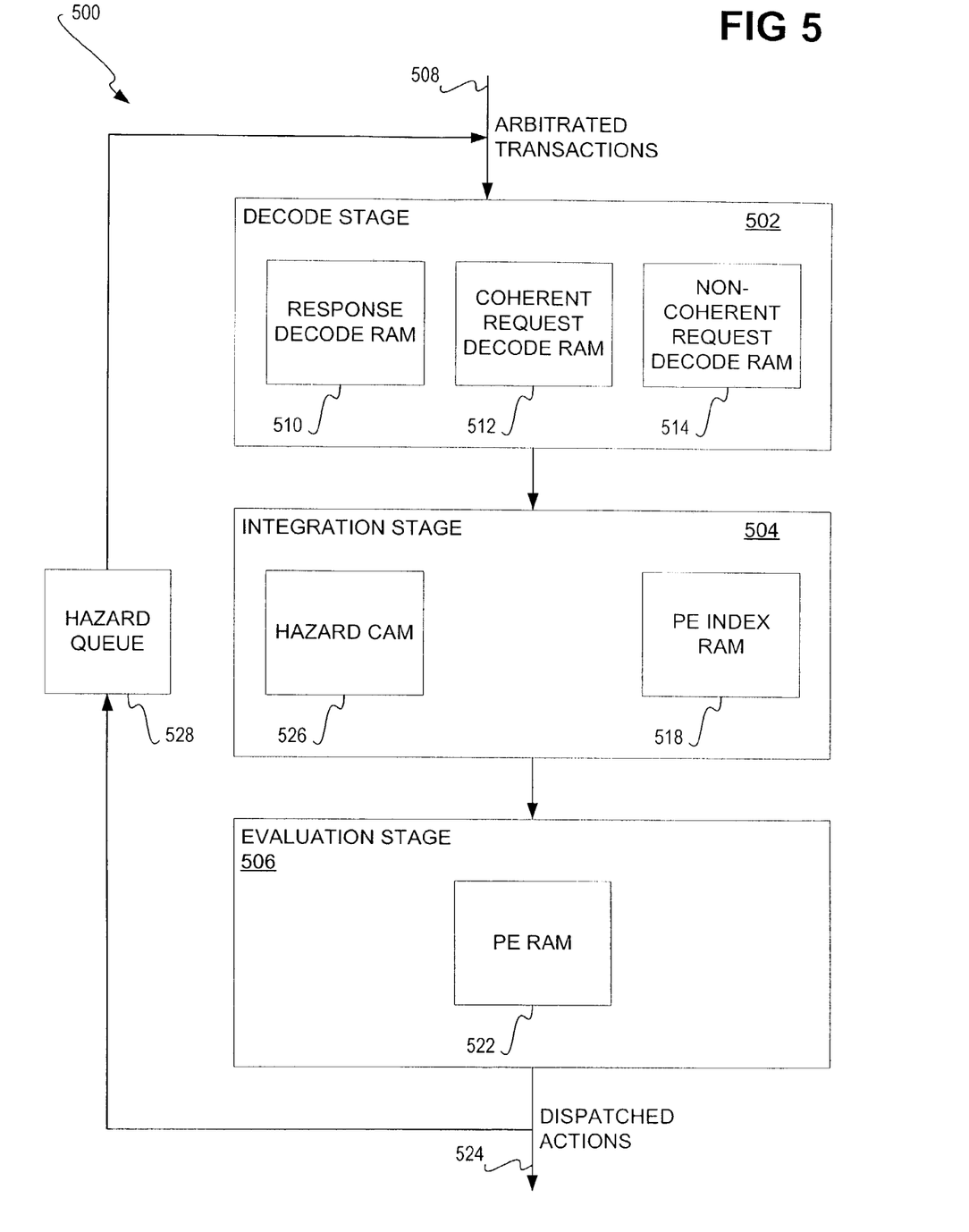
FIG. 5 is a diagram of a multiple-stage pipeline that can be implemented within each of the memory controllers of the node of FIG. 3, to negotiate memory transactions and process any hazards resulting therefrom, according to an embodiment of the invention.

FIG. 5 shows a multiple-stage pipeline 500 that is implemented in each of the memory controllers 310 and 322 of FIG. 3, according to an embodiment of the invention. The multiple-stage pipeline 500 includes a decode stage 502, an integration stage 504, and an evaluation stage 506. As can be appreciated by those of ordinary skill within the art, the pipeline 500 may also have additional stages other than stages 502, 504, and 506 depicted in FIG. 5.

Transactions that have been arbitrated in a given order enter the decode stage 502, as indicated by the incoming arrow 508. The decode stage 502 specifically includes a response decode random-access memory (RAM) 510, a coherent request decode RAM 512, and a non-coherent request decode RAM 514. The RAMs 510, 512, and 514 serve as look-up tables (LUTs) for the decode stage 502 to decode transactions into internal protocol evaluation (PE) commands. That is, each of the RAMs 510, 512, and 514 stores PE commands by transaction. For a given transaction, the decode stage 502 looks to the appropriate LUT of the RAMs 510, 512, and 514 to determine the associated PE command. For responses to requests, the response decode RAM 510 is used. For coherent memory requests, the coherent request decode RAM 512 is used, whereas for non-coherent memory requests, the non-coherent request decode RAM 514 is used.

The PE command is then input into the integration stage 504, as indicated by the incoming arrow 516. The integration stage 504 specifically includes a PE index RAM 518. The PE index RAM 518 is organized by PE command, and stores base addresses into the PE RAM 522 of the evaluation stage 506, which actually stores the actions to be concurrently performed to effect a transaction. The PE index RAM 518 also stores qualifiers for the base addresses, which are offsets off the base address to specify a particular number of the actions stored in the PE RAM 522.

The integration stage 504 may initially re-arbitrate the order of the transactions, as they have been converted to PE commands by the decode stage 504, as compared to the initially arbitrated order of the transactions when incoming into the decode stage 502. For a given PE command, the PE index RAM 518 is looked up to determine the PE RAM base address associated with the command. A number of different PE commands may have the same PE RAM base address associated therewith. Therefore, the PE index RAM 518 is also looked up to determine an associated qualifier, which is different for every PE command, and which particularly specifies an offset to the base address.

The integration stage 504 also includes a hazard content addressable memory (CAM) 526, so that transactions entering the integration stage 504 can be examined for hazards. The hazard CAM 526 stores information related to transactions and other state information to detect and resolve pipeline hazards. Each entry in the hazard CAM 526 can store information for a transaction that is currently in the pipeline 500, or the hazard queue 528, as will be described in more detail. The hazard CAM 526 is preferably a fully associative, content addressable memory structure, so that it can be used to compare the contents of all entries with a supplied comparison value. Transactions that are determined to be hazards are so tagged in the integration stage 504.

As has been indicated, in general a transaction is a hazard where it relates to a memory line to which another transaction in the pipeline 500, or in the hazard queue 528, also relates. Hazards may exist for transactions that are coherent requests, non-coherent requests, or responses. For example, when a transaction enters the pipeline 500, it may relate to a given memory line, and obtain the information stored in the memory line for processing thereof. If another transaction relating to the same memory line enters the pipeline 500, it may potentially obtain stale information—that is, it may obtain information that is outdated, since the earlier transaction may be modifying it.

The PE RAM base address and its qualifier are input into the evaluation stage 506, as indicated by the incoming arrow 520. As has been indicated, the evaluation stage 506 specifically includes the PE RAM 522. The PE RAM 522 stores the actions that are to be selected to effect a given transaction, such as a memory request response or a memory request. Thus, the PE RAM base address and its qualifier reference a number of actions stored in the PE RAM 522. The evaluation stage 506 selects these actions based on the PE RAM base address, using the qualifier as an offset. The resulting selected actions can then be dispatched, as indicated by the outgoing arrow 524, for concurrent performance thereof to effect the transaction that had initially been input into the decode stage 502.

However, if a transaction has been marked as being hazardous in the integration stage 504, then the concurrent set of performable actions to which the transaction has been converted is not dispatched. Rather, the transaction enters the hazard queue 528. The hazard queue 528 stores, preferably in a first-in, first-out (FIFO) manner, transactions that have hazards associated therewith. When the hazard of a transaction is released, then the transaction re-enters the pipeline 500 as part of the arbitrated transactions indicated by the arrow 508. Preferably, transactions exiting the hazard queue 528 are granted priority relative to other of the arbitrated transactions. This ensures that transactions that represent hazards are not unduly delayed due to their presence in the hazard queue 528, such that they are not starved.

Particular Embodiment and Alternative Embodiments

The hazard CAM 526 of FIG. 5 is a fully associated and content-addressable memory structure so that it can be used to compare the contents of all its entries with a supplied comparison value. A supplied cache index may be specifically compared with the index of each entry in the hazard CAM 526, which may be referred to as a lookup. Preferably, the hazard CAM 526 is not a random-access memory (RAM) structure, but rather is implemented with multiple individual registers and random logic to ensure reasonable access time for lookups.

The hazard CAM 526 preferably enforces the following pipeline hazard rules. First, a transaction is considered active in the context of hazard determination if it is referencing a memory line and currently is being processed within the pipeline 500. There may be only one active transaction with a given coherent memory line in the pipeline 500 of FIG. 5, until it has been dispatched. Transactions must be placed in the hazard queue 528 of FIG. 5 if a transaction is already active with the same referenced memory line.

The pipeline hazard rules also include that only one value for a given memory line can be valid and active within the pipeline 500, and that only one active non-coherent transaction be in the pipeline 500 at a single time. Buffered writes for a given memory line must be completed before reads can occur to the same memory line, to maintain data coherency. Transactions waiting in the hazard queue 528 cannot starve, and are given priority over other transactions that have the same memory line, to ensure forward progress. Furthermore, transactions that are not related to any memory line do not need to have a lookup performed for them within the hazard CAM 526.

The manner by which hazards are determined and processed can vary from that which has been described in conjunction with the pipeline 500 of FIG. 5, in alternative embodiments of the invention. For instance, rather than utilizing a hazard CAM 526, a different memory structure, such as a RAM, may be utilized to store memory lines of transactions proceeding through the pipeline 500 to determine hazards. Alternatively, no memory structure, such as CAM 526, may be utilized, and determining a hazard may involve examining all the transactions within the pipeline 500, instead of looking up the memory line of a current transaction within a memory structure, such as the CAM 526.

Hazard determination may occur within another stage of the pipeline 500 as well, or outside of the pipeline 500 completely. For instance, a transaction may be tagged as being a hazard before it enters the decode stage 502 of the pipeline 500, or once it has left the evaluation stage 506 of the pipeline 500. Similarly, a transaction may be routed to the hazard queue 528 other than at the end of the pipeline 500. For example, a transaction may be routed to the hazard queue 528 before being allowed to enter the pipeline 500, or while it is still being processed within the pipeline 500.

Advantages Over the Prior Art

Embodiments of the invention allow for advantages over the prior art. A multiple-stage pipeline allows for more efficient conversion of transactions into concurrently performable actions. The utilization of a hazard queue and a hazard content addressable memory (CAM) ensures that transactions relating to the same memory lines that are currently in the pipeline are properly processed. That is, use of the hazard queue and the hazard CAM promotes successful usage of the multiple-stage pipeline. Without checking for hazards, usage of the multiple-stage pipeline may result in improper processing of transactions that relate to the same memory lines or otherwise represent hazards.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a non-uniform memory access (NUMA) architecture. However, the invention is amenable to implementation in conjunction with systems having other architectures as well. As another example, the system that has been described has two memory controllers. However, more or less memory controllers may also be used to implement a system in accordance with the invention.

Furthermore, the invention is applicable to other alternative embodiments. As noted above, a different memory structure, such as a random-access memory (RAM), may be used to store memory lines to determine hazards, or no memory structure may be provided such that examination of all transactions may be accomplished instead. In addition, hazard determination may be performed outside of the pipeline.

As another example of an alternative embodiment, whereas the invention has largely been described in relation to a pipeline for transaction conversion, it may be utilized in conjunction with other multiple-stage pipelines as well, such as transaction execution pipelines, transaction performance pipelines, and so on. As another example, whereas the invention has been described as having transactions re-enter at the first stage of the pipeline, they may re-enter the pipeline at other stages, too. Finally, whereas the invention has been described as having transactions enter the hazard queue after the last stage of the pipeline, they may also enter the hazard queue at other stages of the pipeline. Accordingly, the scope of protection of this invention is limited only by the following claims and their equivalents.

We claim:

1. A method comprising:
   determining that a transaction represents a hazard relative to another transaction in a pipeline;
   in response to determining that the transaction represents a hazard,
      routing the transaction to a hazard queue after the transaction passes through a last stage of the pipeline; and,
      once the hazard is released, causing the transaction to re-enter the pipeline.

2. The method of claim 1, wherein determining that the transaction represents a hazard comprises determining within the pipeline that the transaction represents a hazard.

3. The method of claim 1, wherein determining that the transaction represents a hazard comprises determining that the transaction is attempting to utilize a memory line being utilized by the other transaction in the pipeline.

4. The method of claim 1, wherein determining that the transaction represents a hazard comprises determining that the transaction represents a hazard in an integration stage of the pipeline.

5. The method of claim 1, wherein determining that the transaction represents a hazard comprises evaluating the transaction against a hazard content-addressable memory (CAM).

6. The method of claim 1, wherein causing the transaction to re-enter the pipeline comprises granting the transaction priority to re-enter the pipeline at a first stage thereof once the hazard is released.

7. The method of claim 1, further comprising:
   in a first stage of the pipeline, decoding the transaction into an internal protocol evaluation (PE) command;
   in a second stage of the pipeline, selecting an entry within a PE random access memory (RAM) based on the internal PE command; and,
   in a third stage of the pipeline, converting the entry within the PE RAM to the concurrent set of performable actions.

8. The method of claim 7, wherein determining that the transaction represents a hazard is accomplished in the second stage.

9. The method of claim 7, wherein routing the transaction to the hazard queue is accomplished after the third stage.

10. A system comprising:
    a plurality of processors;
    local random-access memory (RAM) for the plurality of processors;
    at least one memory controller to manage transactions relative to the local RAM;
    a multiple-stage pipeline within the memory controller, the pipeline including a stage in which transactions are examined for hazards; and,
    a hazard queue within the memory controller, such that those of the transactions having hazards are routed to the hazard queue for pipeline re-entry once the hazards have been released,
    wherein a first memory controller of the at least one memory controller manages transactions relative to a first memory bank, and a second memory controller of the at least one memory controller manages transactions relative to a second memory bank.

11. The system of claim 10, further comprising a plurality of nodes, a first node including the plurality of processors, the local RAM, and the at least one memory controller, an other of the plurality of nodes also including a plurality of processors, local RAM, and at least one memory controller, the plurality of nodes forming a non-uniform memory access (NUMA) architecture in which one of the nodes is able to remotely access the local RAM of the other of the nodes.

12. The system of claim 10, further comprising a hazard content-addressable memory (CAM) for the first memory controller and the second memory controller, for looking up hazards during examination of the transactions for hazards.

13. The system of claim 10, wherein the multiple-stage pipeline comprises a decode stage, an integration stage, and an evaluation stage, the integration stage being the stage in which the transactions are examined for hazards, the evaluation stage being the last stage after which those of the transactions having hazards are routed to the hazard queue.

14. The system of claim 10, wherein the hazards comprise a hazard in which a current transaction is attempting to utilize a memory line being utilized by another transaction in the pipeline.

15. The system of claim 10, wherein the first and the second memory controllers comprise an application-specific integrated circuit (ASIC).

16. A controller for a node of a system to manage transactions relative to at least a portion of memory of the node, comprising:
    a pipeline within which transactions are converted into performable actions to effect the transactions relative to at least the portion of the memory of the node;
    a hazard queue to which to route those of the transactions within the pipeline having hazards until the hazards have been released; and,
    a hazard memory to look up the hazards while the transactions are within the pipeline,
    wherein the multiple-stage pipeline comprises a decode stage, an integration stage, and an evaluation stage, the integration stage being the stage in which the transactions are examined for hazards, the evaluation stage being the last stage after which those of the transactions having hazards are routed to the hazard queue.

17. The controller of claim 16, wherein the pipeline comprises a multiple-stage pipeline, such that the transactions are examined for the hazards within a stage of the pipeline.

18. The controller of claim 16, wherein the controller comprises an application-specific integrated circuit (ASIC).

* * * * *